United States Patent [19]

O'Rear et al.

[11] 4,282,085
[45] Aug. 4, 1981

[54] PETROLEUM DISTILLATE UPGRADING PROCESS

[75] Inventors: Dennis J. O'Rear, Tiburon; Jerome F. Mayer, San Anselmo, both of Calif.

[73] Assignee: Chevron Research Company, San Francisco, Calif.

[21] Appl. No.: 41,209

[22] Filed: May 21, 1979

Related U.S. Application Data

[63] Continuation-in-part of Ser. No. 954,062, Oct. 23, 1978, Pat. No. 4,171,257.

[51] Int. Cl.³ .................. C10G 11/05; C10G 25/03
[52] U.S. Cl. .................................. 208/120; 208/89; 208/254 R; 585/653
[58] Field of Search .................. 208/120, 15, 89, 100, 208/254 R, 254 H, 102

[56] References Cited

U.S. PATENT DOCUMENTS

| | | | |
|---|---|---|---|
| 3,700,585 | 10/1972 | Chen et al. | 208/111 |
| 3,755,145 | 8/1973 | Orkin | 208/111 |
| 3,758,403 | 9/1973 | Rosinski et al. | 208/120 |
| 3,769,202 | 10/1973 | Plank et al. | 208/120 X |
| 3,894,934 | 7/1975 | Owen et al. | 208/97 |
| 3,894,938 | 7/1975 | Gorring et al. | 208/111 |
| 3,894,939 | 7/1975 | Garwood et al. | 208/111 |
| 4,107,032 | 8/1978 | Chester | 208/120 |
| 4,137,148 | 1/1979 | Gillespie et al. | 208/87 |

OTHER PUBLICATIONS

Samuelson and Woelflin, "Treating Improves Cat Cracker Feed", Petroleum Refiner, Sep. 1957, pp. 231-232, Mar. 1958, pp. 197-200, Mar. 1959, pp. 221-223.

Primary Examiner—Delbert E. Gantz
Assistant Examiner—G. E. Schmitkons
Attorney, Agent, or Firm—D. A. Newell; M. K. Bosworth; W. L. Stumpf

[57] ABSTRACT

A petroleum distillate feed is upgraded and a substantial $C_3$-$C_4$ olefin product fraction produced by contacting the feed with ZSM-5 type zeolite at (1) a temperature in the 500°-800° F. range, (2) a pressure below about 13 atmospheres gauge, and (3) an LHSV in the 0.1-15 V/V/Hr range, and fractionating the effluent product stream.

9 Claims, 2 Drawing Figures

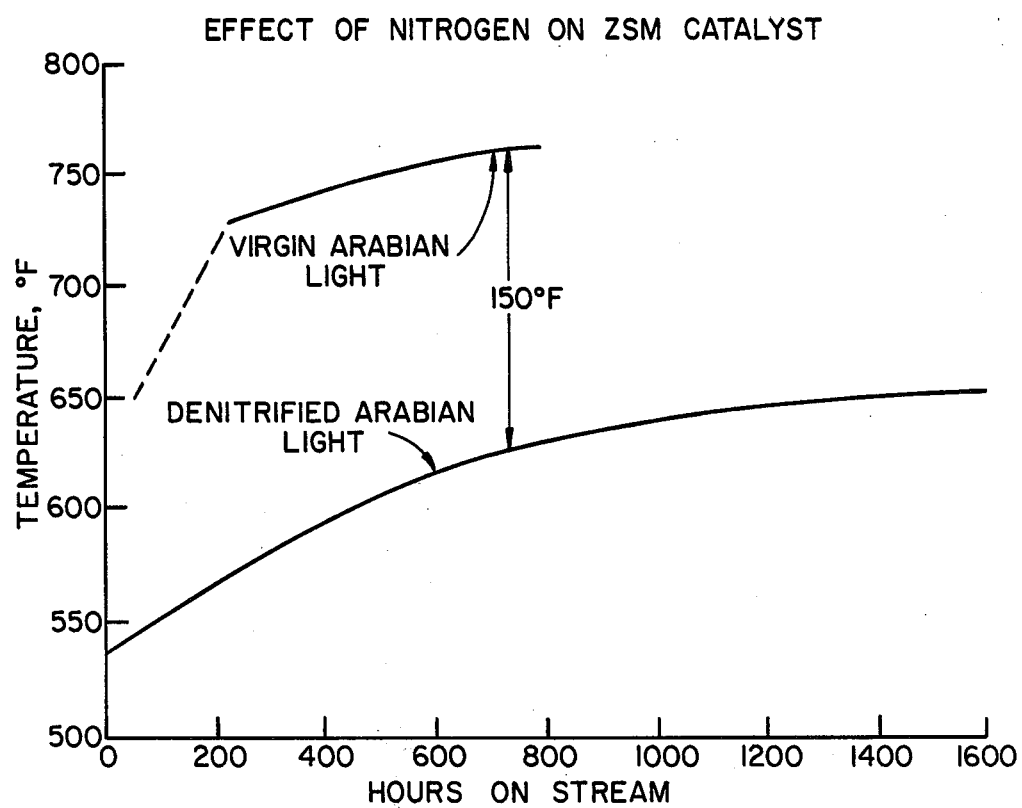
FIG._1.

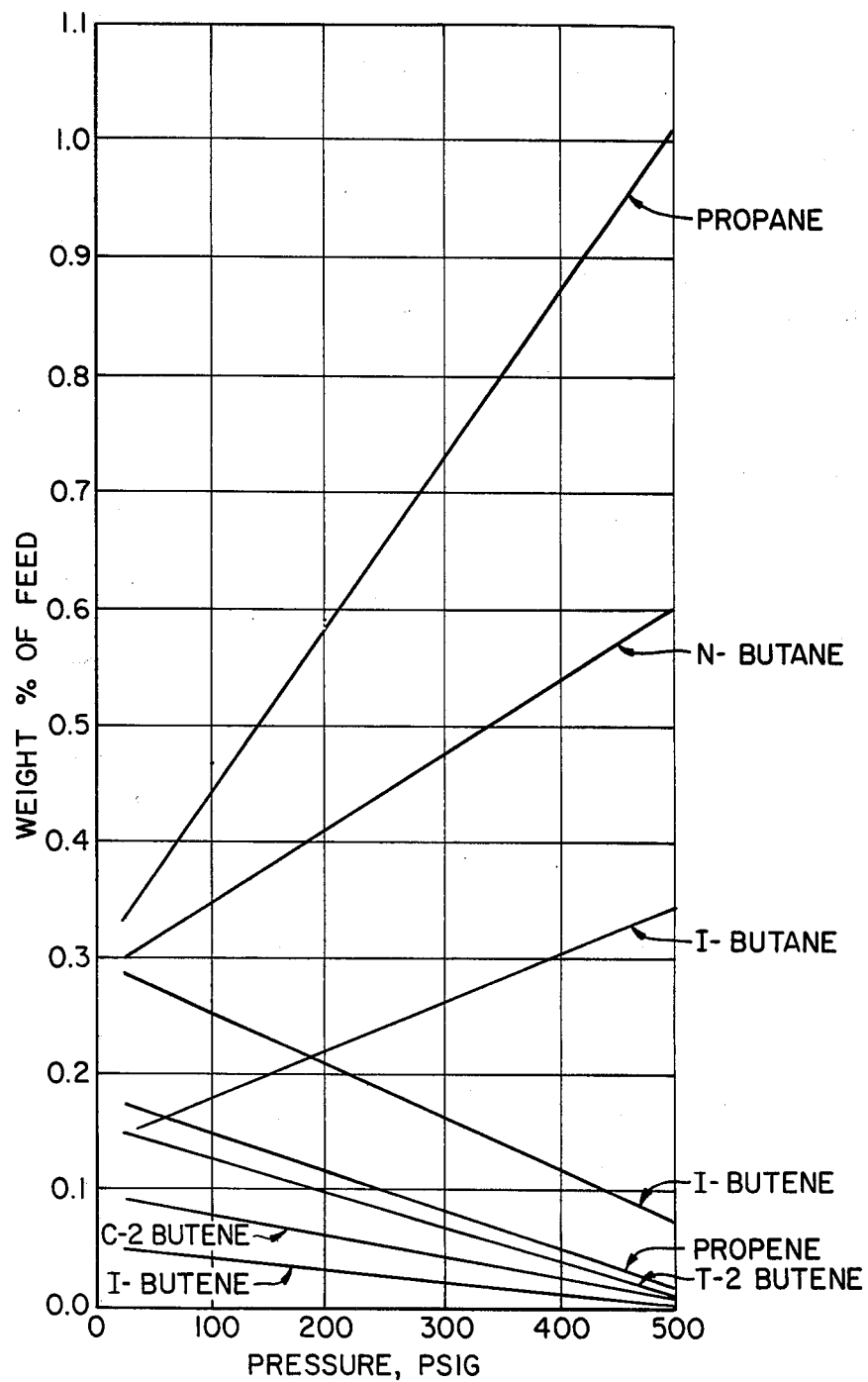
FIG._2.

PETROLEUM DISTILLATE UPGRADING PROCESS

CROSS-REFERENCE TO RELATED APPLICATIONS

This application is a continuation-in-part of our co-pending application Ser. No. 954,062, filed on Oct. 23, 1978, which issued Oct. 16, 1979 as U.S. Pat. No. 4,171,257.

BACKGROUND OF THE INVENTION

1. Field of the Invention

This invention relates to dewaxing of petroleum distillates thereby producing an upgraded feed and a $C_3$–$C_4$ olefin product fraction. This invention deals with hydrodewaxing a distillate feed using a ZSM-5-type zeolite catalyst. More particularly, it relates to dewaxing a distillate feed and producing $C_3$–$C_4$ olefins by contacting the feed with a ZSM-5-type catalyst under low-pressure conditions.

2. Description of the Prior Art

Dewaxing of virgin petroleum distillates using a ZSM-5 catalyst is known in the art (see, for example, U.S. Pat. Nos. 3,894,939—W. E. Garwood—and 4,067,797—N.Y. Chen et al). However, these known processes suffer from disadvantages, including (1) high catalyst fouling or deactivating rates and (2) little or none of the $C_3$–$C_4$ product fraction is $C_3$–$C_4$ olefins.

It is an object of this invention to provide a novel process for carrying out catalytic upgrading of a petroleum distillate in a more effective manner.

It is an object of this invention to provide a process in which at least a substantial portion of the product produced by catalytically dewaxing a distillate using a ZSM-5-type zeolite is a $C_3$–$C_4$ olefin fraction.

Other and additional objects of this invention will be clear from a consideration of the complete specification including the claims thereof.

SUMMARY OF THE INVENTION

A process is provided for upgrading a petroleum distillate feed and producing at least a substantial $C_3$–$C_4$ olefin product fraction, by (1) producing an effluent stream by contacting said feed with a catalyst comprising a ZSM-5-type crystalline aluminosilicate in a form which is substantially free of hydrogenation activity, said contacting being under conditions including (a) a temperature in the frame of from about 500° to 800° F.; (b) a pressure below about 13 atmospheres gauge, and (c) a liquid hourly space velocity in the range of from about 0.1 to 15, said feed having a content of nitrogen-containing impurities, calculated by weight as nitrogen, below about 5 ppm; and (2) recovering said upgraded feed and olefin fraction by fractionating said effluent stream.

By "nitrogen-containing impurities" as used herein is meant organic nitrogen-containing compounds indigenous to crude petroleum and syncrude oils and/or as present in their conventionally hydroprocessed distillate fractions.

DESCRIPTION OF THE FIGURES

FIG. 1 shows the effect of nitrogen on the activity of a ZSM catalyst.

FIG. 2 shows the effect of pressure on light gas yield.

EMBODIMENT

In a preferred embodiment a gas oil is dewaxed with a significant concurrent production of a $C_3$–$C_4$ olefin product fraction in good yield. A typical oil has the following characteristics:

Boiling Point Range (ASTM D-1160), °F.: 445 to 820
Gravity, °API: 37.8
Aniline Point, °F.: 200.2
Total Nitrogen, ppmw as N: 0.5
Sulfur, ppmw as S: 20
Ramsbottom Carbon: 0.5
Refractive Index (80° C.): 1.4375
Density (70° C.): 0.798
Average Molecular Weight: 275

The contacting of the feed with a catalyst consisting of a composite of ZSM-5-type zeolite in a porous alumina matrix (65/35 weight ratio of zeolite to matrix) is carried out in a fixed-bed reactor under conditions including:

Temperature, °F. (average): 750
Space Velocity, LHSV, V/V/Hr: 2.0
Total Pressure, psig: 25
Hydrogen Partial Pressure, psia: 0
Recycle Gas, SCF/B: 0

Typical results from use of the above-described representative feed and conditions include the following weight percent yields

| | |
|---|---|
| $C_1$ | 0.0 |
| $C_2$ (total) | 0.01 |
| $C_3$ (total) | 2.86 |
| Propene | 1.59 |
| $C_4$ (total) | 9.66 |
| Butenes | 7.03 |
| $C_5$–180° F. | 12.19 |
| 180°–380° F. | 6.54 |
| 380°–500° F. | 7.14 |
| 500° F.–End Point | 61.60 |
| Total $C_5+$ | 87.49 |

Under the above conditions and using a low-nitrogen feedstock, the above catalyst experiences a fouling rate of only 0.02° F. per hour. This rate, surprisingly, is but about one-fifth the expected rate in view of the prior art, for example: (1) U.S. Pat. No. 4,067,797, N.Y. Chen et al; and (2) the article entitled "New Process Cuts Pour Point of Distillates" by N.Y. Chen et al, The Oil and Gas Journal, June 1977, pp. 165–170.

THE CATALYST

The ZSM-5-type catalyst employed is a crystalline aluminosilicate zeolite having a silica to alumina ratio greater than 12 and preferably greater than 30 and is exemplified by ZSM-5, ZSM-8, ZSM-11, ZSM-12, ZSM-21 and other similarly-acting aluminosilicates, and are described in the prior art. For example, ZSM-5 is described in U.S. Pat. Nos. 3,702,886 and 3,770,614; ZSM-8 is described in U.S. Ser. No. 865,418 filed Oct. 10, 1969 (now abandoned), ZSM-11 is described in U.S. Pat. No. 3,709,979; ZSM-12 is described in U.S. Pat. No. 3,832,449, and ZSM-21 is described in U.S. Pat. No. 3,948,758; and relevant portions of these patents are incorporated herein by reference. The ZSM-5-type catalyst may be in the hydrogen form or in a metal cation or cation complex form which possesses little or no hydrogenation activity, such as a calcium, strontium, barium, zinc, copper, silver or rare earth form, with the hydrogen form being preferred. Hydrogenation activity of a catalyst is the capability of the catalyst to adsorb and dissociate molecular hydrogen.

The hydrogen and other forms of the ZSM-5-type zeolite may be obtained by conventional base and/or ion-exchange methods routinely employed in the zeolite art, including customary drying and calcining steps. Preferably the ZSM-5-type zeolite catalyst herein has a minimal sodium content, for example, by weight less than 1 weight percent, more preferably less than about 100 ppm, although a ZSM-5-type zeolite having a larger sodium content exhibits a relatively useful catalytic activity for present purposes.

The ZSM-5-type catalyst may be in any convenient form, that is, as required for ordinary fixed-bed, fluid-bed or slurry use. Preferably it is used in a fixed-bed reactor and in a composite with a porous inorganic binder or matrix in such proportions that the resulting product contains from 1% to 95% by weight, and preferably from 10% to 70% by weight, of the zeolite in the final composite.

The term "porous matrix" includes inorganic compositions with which a zeolite can be combined, dispersed, or otherwise intimately admixed wherein the matrix may or may not be catalytically active in a hydrocarbon cracking sense. The porosity of the matrix can either be inherent in the particular material or it can be caused by mechanical or chemical means. Representative of satisfactory matrices include pumice, fire-brick, diatomaceous earths, and inorganic oxides. Representative inorganic oxides include alumina, silica, amorphous silica-alumina mixtures, naturally occurring and conventionally processed clays, for example bentonite, kaolin and the like, as well as other siliceous oxide mixtures such as silica-magnesia, silica-zirconia, silica-titania and the like.

The compositing of the zeolite with an inorganic oxide matrix can be achieved by any suitable known method wherein the zeolite is intimately admixed with the oxide while the latter is in a hydrous state, for example as a hydrosol, hydrogel, wet gelatinous precipitate, or in a dried state or combinations thereof. A convenient method is to prepare a hydrous mono or plural oxide gel or cogel using an aqueous solution of a salt or mixture of salts, for example aluminum sulfate, sodium silicate and the like. To this solution is added ammonium hydroxide, carbonate, etc., in an amount sufficient to precipitate the oxides in hydrous form. After washing the precipitate to remove at least most of any water-soluble salt present in the precipitate, the zeolite in finely divided state is thoroughly admixed with the precipitate together with added water or lubricating agent sufficient in amount to facilitate shaping of the mix as by extrusion.

THE FEED

Petroleum hydrocarbon distillates, and the like, containing at least a significant (5 volume percent) content of normal paraffins and/or slightly branched paraffins are satisfactory feeds for the present process provided that they have a content of nitrogen-containing impurities, calculated as nitrogen, which is less than 5, preferably less than 1, ppmw.

Representative feeds include atmospheric or vacuum gas oils and fractions and mixtures thereof, for example having normal boiling point ranges in the range 400° to 1000°, preferably 500° to 850° F.

Process feeds herein may contain sulfur-containing impurities. However, the resulting product, in general, will also contain undesirable sulfur-containing impurities to some degree. Preferably process feeds herein contain, calculated as sulfur, less than 20 ppmw of sulfur-containing impurities.

PROCESS CONDITIONS

The process conditions satisfactory for use in the process of the invention may vary, depending upon such factors as the feed, the conversion desired, the catalyst age and the like. In general, satisfactory conditions include:

|  | Broad Range | Preferred Range |
| --- | --- | --- |
| Temperature, °F. | 500–800 | 550–750 |
| Pressure, psig | <200 | 0–25 |
| Space Velocity, LHSV, V/V/Hr. | 0.5–10 | 2–4 |

The yield of $C_3$–$C_4$ olefins has been found to be very sensitive to the system pressure. Thus, at about 500 psig, the yield of these olefins is negligible. As the pressure is decreased below 500 psig, an increasingly significant yield of $C_3$–$C_4$ olefins is produced. These olefins are especially desirable and are valuable for many well-known uses in the petroleum and chemical processing arts, whereas their alkane counterparts are far less desirable products. The yield of $C_3$–$C_4$ olefins varies, depending upon the particular feed, conditions and catalyst employed, in the range of from about 2 to 10 weight percent of the feed converted.

The following specific examples will serve to further illustrate the process of the present invention and the advantages thereof.

EXAMPLE I

A comparison test was run to determine the effect of nitrogen on a ZSM catalyst. A raw Arabian light oil and a hydrodenitrogenated Arabian light oil having the following properties:

|  | Raw Arabian Light | HDN Arabian Light |
| --- | --- | --- |
| Gravity °API | 27.4 | 37.5 |
| Aniline point, °F. | 176.4 | 182.3 |
| Sulfur, wt % | 2.06 | 0.0037 |
| Total N, ppm | 445 | 0.74 |
| D-1160 Distillation |  |  |
| 10%/30% °F. | 693/733 | 464/566 |
| 50%/70% °F. | 756/776 | 641/699 |
| 90%/EP °F. | 809/870 | 761/837 |
| % Paraffinic Carbon | 65 | 63 |
| % Naphthenic Carbon | 16 | 25 |
| % Aromatic Carbon | 19 | 12 | were contacted over a catalyst containing 65 H-ZSM-5 and 35% alumina at atmospheric pressure, with no hydrogen or recycle gas, an LHSV=2, and a temperature adjusted to maintain a 17% conversion. The results of the test as shown in FIG. 1, indicate that initially the raw oil fouls the catalyst four times as fast as the denitrified oil, until equilibrium is reached. After equilibrium is reached, the catalyst which processes denitrified oil is about 150° F. more active than the catalyst which processes the raw oil, indicating the use of a ZSM-5-type catalyst with a denitrified oil will exhibit a much longer run life than catalyst processing raw oil.

EXAMPLE II

This experiment was carried out to show the effect of pressure on the yields of light paraffinic and olefinic gases. A hydrodenitrogenated gas oil having the following characteristics:

| | |
|---|---|
| Gravity, °API | 34.1 |
| Aniline point, °F. | 170.3 |
| Sulfur wt % | 0.0019 |
| Total N, ppm | 0.63 |
| D-1160 Distillation | |
| 10%/50%/90% °F. | 377/654/796 |
| Carbon Type, % P/% N/% A | 48.9/41.5/9.5 | was contacted with a catalyst consisting of 65% H-ZSM-5 and 35% alumina at mild conversion conditions including 600° F., LHSV=2, 2000 SCF/BBL recycle gas, and at the following pressures: 500 psig, 200 psig, 100 psig and 25 psig. The results, as shown in FIG. 2, indicate that the amount of olefins in the light product gas increases dramatically as the pressure is decreased—for example, at 500 psig, the wt % $C_4=$ to total $C_4$ is 0.08, whereas at 100 psig, it is 0.46, and at 25 psig, it is 0.56. Thus, low pressure enhances the relative proportion of olefins produced in the light product gas.

Other embodiments of the invention will be apparent to the skilled in the art from a consideration of this specification or practice of the invention disclosed herein. It is intended that the specification and examples be considered exemplary only with the true scope and spirit of the invention being indicated by the following claims:

What is claimed is:

1. A process for upgrading a petroleum distillate feed consisting essentially of hydrocarbons having a normal boiling point range in the range of from about 400° to 1000° F. and producing $C_3$-$C_4$ olefins, based upon feed converted, in an amount in the range of from about 2 to 10 weight percent, comprising producing an effluent stream containing $C_3$-$C_4$ olefins by contacting said feed with a catalyst comprising ZSM-5-type crystalline aluminosilicate zeolite in a form which is substantially free of hydrogenation activity, said contacting being under conditions including (a) a temperature in the range of from about 500° to 800° F.; (b) a pressure below about 13 atmospheres gauge; and (c) a liquid hourly space velocity in the range of from about 0.1 to 15, said feed having a content of nitrogen-containing impurities, calculated by weight as nitrogen, below about 5 ppm.

2. A process as in claim 1 wherein said temperature is about 750° F., said space velocity is about 2, and said pressure is about 25 psig.

3. A process as in claim 1 wherein said catalyst is a composite of said zeolite and a porous binder or matrix, and said composite contains an amount of the zeolite in the range of from about 1 to 95 weight percent.

4. A process as in claim 1 wherein said feed has (1) a normal boiling point range in the range of from about 400° to 1000° F., (2) a sulfur-containing impurities content, calculated as sulfur, below about 20 ppm, and (3) a nitrogen-containing impurities content below about 1 ppmw.

5. A process as in claim 4 wherein said normal boiling point range is 500° to 800° F.

6. A process as in claim 1 wherein said catalyst is in a composite with a porous inorganic binder or matrix in such proportions as to contain said zeolite, in parts by weight, in an amount in the range of from about 1 to 95 percent.

7. A process as in claim 6 wherein said amount of zeolite is in the range 10 to 70 percent.

8. A process as in claim 1 wherein said zeolite is substantially in the hydrogen form.

9. A process as in claim 1 wherein said zeolite is ZSM-5.

* * * * *